United States Patent
Bylund (10) Patent No.: US 11,267,160 B2
(45) Date of Patent: Mar. 8, 2022

(54) LUBRICATION MONITORING ARRANGEMENT, HAND-HELD CUTTING TOOL AND METHOD

(71) Applicant: HUSQVARNA AB, Huskvarna (SE)

(72) Inventor: Christian Bylund, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 139 days.

(21) Appl. No.: 16/760,774

(22) PCT Filed: Oct. 4, 2018

(86) PCT No.: PCT/SE2018/051013
§ 371 (c)(1),
(2) Date: Apr. 30, 2020

(87) PCT Pub. No.: WO2019/088891
PCT Pub. Date: May 9, 2019

(65) Prior Publication Data
US 2020/0276661 A1      Sep. 3, 2020

(30) Foreign Application Priority Data
Nov. 1, 2017  (SE) ..................... 1751356-5

(51) Int. Cl.
*B27B 17/12*  (2006.01)
*B23Q 11/10*  (2006.01)
(Continued)

(52) U.S. Cl.
CPC .............. *B27B 17/12* (2013.01); *B23D 59/02* (2013.01); *B23Q 11/1092* (2013.01); *B23D 59/001* (2013.01)

(58) Field of Classification Search
CPC ................ B27B 17/12; F16N 2200/14; C10N 2240/401; B23Q 11/10; B23Q 11/1092; Y10T 83/263
See application file for complete search history.

(56) References Cited

U.S. PATENT DOCUMENTS 3,432,840 A  3/1969 Neapolitakis et al.
3,922,658 A  11/1975 Harper et al.
(Continued)

FOREIGN PATENT DOCUMENTS

CN  200984755 Y  12/2007
CN  101668617 A   3/2010
(Continued)

OTHER PUBLICATIONS

"Level Switch K-5720," Switzer, 1299 K-5720 / Accessed last on Feb. 26, 2016, Rev. 1Retrieved from :—http://switzerprocess.co.in/image/data/pdf/LevelSwitchesK-5720.pdf.
(Continued)

*Primary Examiner* — Jennifer S Matthews
(74) *Attorney, Agent, or Firm* — Burr & Forman, LLP (57) ABSTRACT

A lubrication monitoring arrangement (1) is disclosed configured to monitor a supply of lubricant in a lubrication system (3) of a hand-held cutting tool (5). The arrangement (1) comprises a heating element (13) and a control unit (15). The heating element (13) is arranged to heat a portion (17', 17", 17''', 17'''') of the lubrication system (3). The control unit (15) is configured to monitor the supply of lubricant in the lubrication system (3) by monitoring the change in temperature of the portion (17', 17", 17''', 17'''') of the lubrication system (3). The present disclosure further relates to a hand-held cutting tool (5), and a method (100) of monitoring a supply of lubricant in a lubrication system (3) of a hand-held cutting tool (5).

19 Claims, 2 Drawing Sheets

(51) Int. Cl.
*B23D 59/02* (2006.01)
*B23D 59/00* (2006.01)

(56) References Cited

U.S. PATENT DOCUMENTS

| | | | |
|---|---|---|---|
| 4,354,183 A | 10/1982 | Weeks et al. | |
| 4,637,493 A * | 1/1987 | Ehlert | F16N 39/04 |
| | | | 184/55.1 |
| 4,802,555 A | 2/1989 | Matsunaga et al. | |
| 5,182,720 A | 1/1993 | Beck et al. | |
| 5,582,237 A * | 12/1996 | Miyano | B23Q 11/141 |
| | | | 165/259 |
| 7,596,998 B2 | 10/2009 | Zimmermann et al. | |
| 2010/0043234 A1 | 2/2010 | Pellenc | |
| 2011/0089155 A1 * | 4/2011 | Lee | B23D 59/02 |
| | | | 219/241 |
| 2012/0247876 A1 | 10/2012 | Kreutzkamper et al. | |
| 2017/0021523 A1 * | 1/2017 | Haney | B27B 17/12 |
| 2017/0120471 A1 | 5/2017 | Kawamura et al. | |

FOREIGN PATENT DOCUMENTS

| | | | | |
|---|---|---|---|---|
| CN | 202805328 U | | 3/2013 | |
| CN | 104574796 A | | 4/2015 | |
| CN | 207841595 U | | 9/2018 | |
| DE | 3436121 A1 | | 5/1985 | |
| DE | 202004014254 U1 | | 11/2004 | |
| DE | 202007017548 U1 | | 5/2008 | |
| DE | 102015117027 A1 * | 5/2016 | | B23Q 11/1015 |
| EP | 0140844 A2 | | 5/1985 | |
| EP | 0193322 A2 | | 9/1986 | |
| EP | 2353779 A1 * | 8/2011 | | B23Q 11/1053 |
| EP | 3009243 A1 | | 4/2016 | |
| EP | 3162519 A1 | | 5/2017 | |
| FR | 2415721 A1 | | 8/1979 | |
| IN | 20090031614 A | | 8/2010 | |
| JP | 2004347396 A | | 12/2004 | |
| JP | 2004347500 A | | 12/2004 | |
| JP | 2005257616 A | | 9/2005 | |
| WO | 1983000765 A1 | | 3/1983 | |

OTHER PUBLICATIONS

"Thermistors in Single Supply Temperature Sensing Circuits," Bonnie C. Baker, Microchip Technology Inc, Accessed last on Feb. 26, 2016, Retrieved from :—http://ww1.microchip.com/downloads/en/AppNotes/00685b.pdf.

"Improve System Reliability with Lubricant Flow Confirmation," Paul Conley, SKF & Canlong He, SKF, Accessed last on Feb. 26, 2016, Retrieved from :—http://www.machinerylubrication.com/Read/29460/lubricant-flow-confirmation.

Swedish Search Report for Application No. 1751356-5 dated May 18, 2018.

International Search Report and Written Opinion for International Application No. PCT/SE2018/051013 dated Dec. 4, 2018.

International Preliminary Report on Patentability for International Application No. PCT/SE2018/051013 dated May 5, 2020.

* cited by examiner

LUBRICATION MONITORING ARRANGEMENT, HAND-HELD CUTTING TOOL AND METHOD

TECHNICAL FIELD

The present disclosure relates to a lubrication monitoring arrangement configured to monitor a supply of lubricant in a lubrication system of a hand-held cutting tool. The present disclosure further relates to a hand-held cutting tool comprising a cutting unit and a lubrication system configured to lubricate the cutting unit. Further, the present disclosure relates to a method of monitoring a supply of lubricant in a lubrication system of a hand-held cutting tool.

BACKGROUND

Various types of hand-held cutting tools are available on the market today. Examples are chainsaws, hedge trimmers, cutting saws, pole saws, and the like. Common features of hand-held cutting tools are that they comprise one or more handle portions, or handles, allowing a user to grip the tool with one or two hands. Further, they comprise at least one cutting unit, which may be in the form of a cutting chain, a shear, a cutter, a saw blade, or the like. Some cutting tools comprise a lubrication system configured to lubricate the cutting unit with a lubricant, such as oil. Lubricating the cutting unit is advantageous since metal to metal contact is avoided which reduces wear of the cutting unit and prolongs the life time of the cutting unit. Further, generation of heat and noise is lowered during operation of the cutting tool, and the driving resistance of the cutting unit can be lowered, which can reduce the energy consumption of the cutting tool.

The supply of lubricant in such a lubrication system is an important factor for the operational abilities, the life time, and the energy consumption of the cutting tool. This because an insufficient supply of lubricant may reduce the life time of the cutting unit, may increase the generation of heat and noise during operation of the cutting tool, and may increase the driving resistance of the cutting tool.

Lubrication systems comprise a tank accommodating the lubricant. Usually, the supply of lubricant in a lubrication system can be monitored using a dipstick, a transparent inspection window, an inspection opening comprising a cover, and/or a float arranged in the tank, wherein the float is connected to a gauge configured to indicate the supply of lubricant in the tank.

All these methods and arrangements for monitoring the supply of lubricant in a lubrication system are associated with drawbacks, especially when used on a hand-held cutting tool.

SUMMARY

It is an object of the present invention to overcome, or at least alleviate, at least some of the above-mentioned problems and drawbacks.

According to a first aspect of the invention, the object is achieved by a lubrication monitoring arrangement configured to monitor a supply of lubricant in a lubrication system of a hand-held cutting tool, wherein the lubrication system comprises a tank and a conduit, and wherein the conduit is configured to duct lubricant from the tank to a cutting unit of the cutting tool. The arrangement comprises a heating element and a control unit, wherein the heating element is arranged to heat a portion of the lubrication system, and wherein the control unit is configured to monitor the supply of lubricant in the lubrication system by monitoring the change in temperature of the portion of the lubrication system.

Thereby, a lubrication monitoring arrangement is provided capable of monitoring the supply of lubricant in the lubrication system in an efficient and reliable manner.

A hand-held cutting tool, such as a chainsaw, hedge trimmer, cutting saw, and pole saw, is usually arranged to operate at different angles relative a horizontal plane, and thus relative the gravitational field. At different angles relative the gravitational field, the lubricant in the tank will be at different portions of the tank. Therefore, solutions utilizing a dipstick, a transparent inspection window, an inspection opening comprising a cover, and/or a float can only provide a proper indication of the supply of lubricant when the cutting tool is oriented at a predetermined orientation angle relative the gravitational field. However, since the control unit, according to the present disclosure, is configured to monitor the supply of lubricant in the lubrication system by monitoring the change in temperature of the portion of the lubrication system, the lubrication monitoring arrangement, according to the present disclosure, may be less sensitive to the effects of different orientation angles of the cutting tool.

Further, a cutting tool consumes significant amounts of lubricant during operation. One reason for that is that when the cutting tool is used for cutting an object, some of the lubricant ducted to the cutting unit will stick to the object. A solution utilizing a dipstick, a transparent inspection window, an inspection opening comprising a cover, and/or a float, is arranged to provide an indication of the supply of lubricant when the cutting tool is not used for cutting, and as mentioned above, when the cutting tool is oriented at a predetermined orientation angle relative the gravitational field. However, since the control unit, according to the present disclosure, is configured to monitor the supply of lubricant in the lubrication system by monitoring the change in temperature of the portion of the lubrication system, a lubrication monitoring arrangement is provided capable of monitoring the supply of lubricant during operation of the hand-held cutting tool. Since the supply of lubricant can be monitored during operation of the hand-held cutting tool, an insufficient supply of lubricant that occurs during operation of the cutting tool can be detected. As a result, a lubrication monitoring arrangement is provided with an improved ability to monitor the supply of lubricant in a lubrication system of a hand-held cutting tool. As a further result thereof, the lubrication monitoring arrangement may reduce the risk of excessive wear of a cutting unit of a hand-held cutting tool.

Accordingly, a lubrication monitoring arrangement is provided overcoming, or at least alleviating, at least some of the above-mentioned problems and drawbacks. As a result, the above-mentioned object is achieved.

Optionally, the portion of the lubrication system is a portion of the conduit. Thereby, a lubrication monitoring arrangement is provided capable of detecting an insufficient supply of lubricant in the tank, as well as detecting an insufficient supply of lubricant in the lubrication system caused a malfunction of the lubricant system. Such a malfunction of the lubricant system may for example be caused by a clogged conduit, a clogged inlet or outlet of the conduit, a clogged lubricant filter, if present in the conduit, a clogged vent opening of the tank, if present, and/or a malfunction of a pump configured to pump lubricant through the conduit, if present. The lubrication monitoring arrangement is capable of detecting an insufficient supply of lubricant caused a malfunction of the lubricant system since such a malfunction will affect the change in temperature of the portion of the conduit.

That is, in case the lubrication system is working properly, and lubricant is flowing through the conduit, the flow of lubricant will have a cooling effect on the portion of the conduit. On the contrary, if lubricant is present in the conduit but a malfunction of the lubrication system causes the lubricant to be stationary in the conduit, the portion will be subjected to a slower increase in temperature than is the case when lubricant is flowing through the conduit. Further, if air is present in the portion of the conduit, for example due to an insufficient supply of lubricant in the tank of the lubrication system, the portion will be subjected to a higher increase in temperature than is the case when lubricant is stationary or is flowing in the conduit. This because lubricant has a higher heat capacity than air.

Accordingly, the control unit of the lubrication monitoring arrangement may detect all the above-mentioned states of the lubrication system simply by monitoring the change in temperature of the portion of conduit.

In addition, in embodiments where the portion of the lubrication system is a portion of the conduit, a lubrication monitoring arrangement is provided being further less sensitive to the effects of different orientation angles of the cutting tool.

Accordingly, a lubrication monitoring arrangement is provided with a further improved ability to monitor the supply of lubricant in a lubrication system of a hand-held cutting tool.

Optionally, the portion of the lubrication system is a portion of the tank. Thereby, a simple and reliable a lubrication monitoring arrangement is provided.

Optionally, the lubrication system comprises a pump configured to pump lubricant through the conduit from the tank to the cutting unit, and wherein the portion of the lubrication system is a portion of the pump. Thereby, a lubrication monitoring arrangement is provided capable of detecting an insufficient supply of lubricant in the tank, as well as detecting an insufficient supply of lubricant in the lubrication system caused a malfunction of the lubricant system. Such a malfunction of the lubricant system may for example be caused by a clogged conduit, a clogged inlet or outlet of the conduit, a clogged lubricant filter, if present in the conduit, a clogged vent opening of the tank, if present, and/or a malfunction of the pump. The lubrication monitoring arrangement is capable of detecting an insufficient supply of lubricant caused a malfunction of the lubricant system since such a malfunction will affect the change in temperature of the portion of the pump.

That is, in case the lubrication system is working properly, and lubricant is flowing through the pump, the flow of lubricant will have a cooling effect on the portion of the pump. Thereby, when the portion is heated, the portion will be subjected to a slower increase in temperature than is the case when air is present in the portion of the pump, and that is the case when lubricant is stationary in the portion of the pump. Further, if lubricant is present in the pump but a malfunction of the lubrication system causes the lubricant to not flow through the pump, the portion will be subjected to a slower increase in temperature than is the case when air is present in the portion of the pump. This because lubricant has a higher heat capacity than air.

Accordingly, the control unit of the lubrication monitoring arrangement may detect all the above-mentioned states of the lubrication system simply by monitoring the change in temperature of the portion of pump.

In addition, in embodiments where the portion of the lubrication system is a portion of the pump, a lubrication monitoring arrangement is provided being further less sensitive to the effects of different orientation angles of the cutting tool.

Accordingly, a lubrication monitoring arrangement is provided with an improved ability to monitor the supply of lubricant in a lubrication system of a hand-held cutting tool.

Optionally, the control unit is configured to monitor the change in temperature of the portion of the lubrication system by monitoring the change in electrical resistance of the heating element. The electrical resistance of a heating element changes in dependence of the temperature of the heating element. Thus, by monitoring the change in electrical resistance of the heating element, the control unit is able to monitor the change in temperature of the portion of the lubrication system in a simple, efficient and reliable manner.

Optionally, the arrangement comprises a temperature sensor, wherein the temperature sensor is in thermal contact with the portion of the lubrication system, and wherein the control unit is configured to monitor the change in temperature of the portion of the lubrication system using data from the temperature sensor. Thereby, the control unit is configured to monitor the change in temperature of the portion of the lubrication system in a simple, efficient and reliable manner.

Optionally, the control unit is configured to monitor the change in temperature of the portion during heating of the portion. Thereby, an instantaneous monitoring of the effects of the heating is performed. As a result, a lubrication monitoring arrangement is provided capable of monitoring the supply of lubricant in a lubrication system of a hand-held cutting tool in a still further efficient and reliable manner.

Optionally, the control unit is configured to monitor the supply of lubricant in the lubrication system by monitoring the temperature of the portion a predetermined time after the heating element has started to heat the portion. Thereby, the monitoring of the effects of the heating is performed in a consistent, comparable, and simple manner. As a result, a lubrication monitoring arrangement is provided capable of monitoring the supply of lubricant in a lubrication system of a hand-held cutting tool in a still further efficient and reliable manner.

Optionally, the heating element is configured to heat the portion recurringly at regular or irregular intervals. Thus, according to these embodiments, the portion may be heated during some time periods and may not be heated during some other time periods. Further, according to some embodiments, the heating element may be configured to heat the portion with a varying amount of heating. As a result, the control unit can more easily monitor changes in temperature of the portion and thus also more easily monitor the supply of lubricant in a lubrication system of a hand-held cutting tool. Thus, a lubrication monitoring arrangement is provided capable of monitoring the supply of lubricant in a lubrication system of a hand-held cutting tool in a still further efficient and reliable manner. Further, in embodiments where the heating element is configured to heat the portion recurringly at regular or irregular intervals, or with a varying amount of heating, the energy consumption of the heating element can be lowered.

Optionally, the control unit is configured to notify a user of the hand-held cutting tool in case the monitored supply of lubricant in the lubrication system is below a predetermined threshold value. Thereby, a lubrication monitoring arrangement is provided capable of assisting a user of a hand-held cutting tool to avoid metal to metal contact, to reduce wear of the cutting unit, to prolong the life time of the cutting unit of the hand-held cutting tool, to lower the generation of heat and noise of the cutting tool, and/or to lower the driving resistance of the cutting unit, in an efficient and reliable manner.

According to a second aspect of the invention, the object is achieved by a hand-held cutting tool comprising a cutting unit and a lubrication system configured to lubricate the cutting unit, wherein the lubrication system comprises a tank and a conduit, wherein the conduit is configured to duct lubricant from the tank to the cutting unit, and wherein the cutting tool further comprises a lubrication monitoring arrangement according to some embodiments.

Since the hand-held cutting tool comprises a lubrication monitoring arrangement according to some embodiments, a hand-held cutting tool is provided capable of monitoring the supply of lubricant in the lubrication system thereof in an efficient and reliable manner.

Further, a hand-held cutting tool is provided where the supply of lubricant in the lubrication system thereof is monitored in a manner being less sensitive to the effects of different orientation angles of the hand-held cutting tool.

Still further, a hand-held cutting tool is provided where an insufficient supply of lubricant that occurs during operation of the cutting tool can be detected.

Accordingly, a hand-held cutting tool is provided with an improved ability to monitor the supply of lubricant in the lubrication system thereof.

Thus, a hand-held cutting tool is provided overcoming, or at least alleviating, at least some of the above-mentioned problems and drawbacks. As a result, the above-mentioned object is achieved.

Optionally, the cutting tool comprises an electric motor configured to drive the cutting unit during operation of the cutting tool. Thereby, an environmentally friendly cutting tool is provided. Further, studies have shown that a user of an electrically driven hand-held cutting tool more likely will fail to fill the tank of the lubrication system than a user of a hand-held cutting driven by a combustion engine. The reason may be that a user of a hand-held cutting tools driven by a combustion engine is more used to refill fluids such as fuel and will thereby more likely remember to also fill lubricant into the tank of the lubrication system. In addition, the consumption of lubricant is approximately proportional to the consumption of fuel, usually by the factor 1:2. Thereby, experienced users of hand-held cutting tools driven by a combustion engine will usually remember to fill lubricant into the tank of the lubrication system every second time the fuel tank is filled.

Since the hand-held cutting tool provided is capable of monitoring the supply of lubricant in the lubrication system in an efficient and reliable manner, the above-mentioned problem can be solved in an efficient and reliable manner.

Optionally, the cutting tool is a chainsaw, and wherein the cutting unit is a cutting chain. Thereby, a chainsaw is provided capable of monitoring the supply of lubricant in the lubrication system of the cutting chain of the chainsaw in an efficient and reliable manner.

Further, a chainsaw is provided where the supply of lubricant in the lubrication system is monitored in a manner being less sensitive to the effects of different orientation angles of the chainsaw.

Still further, a chainsaw is provided where an insufficient supply of lubricant that occurs during operation of the chainsaw can be detected.

Accordingly, a chainsaw is provided with an improved ability to monitor the supply of lubricant in the lubrication system thereof.

According to a third aspect of the invention, the object is achieved by a method of monitoring a supply of lubricant in a lubrication system of a hand-held cutting tool, wherein the lubrication system comprises a tank and a conduit, wherein the conduit is configured to duct lubricant from the tank to a cutting unit of the cutting tool, and wherein the method comprises:

heating a portion of the lubrication system, and
monitoring the supply of lubricant in the lubrication system by monitoring the change in temperature of the portion of the lubrication system.

Since the method comprises the steps of heating a portion of the lubrication system, and monitoring the supply of lubricant in the lubrication system by monitoring the change in temperature of the portion of the lubrication system, a method is provided capable of monitoring the supply of lubricant in the lubrication system in an efficient and reliable manner.

A hand-held cutting tool, such as a chainsaw, hedge trimmer, cutting saw, and pole saw is usually arranged to operate at different angles relative a horizontal plane, and thus relative the gravitational field. At different angles relative the gravitational field, the lubricant in the tank will be at different portions of the tank. Therefore, solutions utilizing a dipstick, a transparent inspection window, an inspection opening comprising a cover, and/or a float can only provide a proper indication of the supply of lubricant when the cutting tool is oriented at a predetermined orientation angle relative the gravitational field. However, since the method, according to the present disclosure, comprises the step of monitoring the supply of lubricant in the lubrication system by monitoring the change in temperature of the portion of the lubrication system, a method is provided being less sensitive to the effects of different orientation angles of the hand-held cutting tool.

Further, a cutting tool consumes significant amounts of lubricant during operation. One reason for that is that when the cutting tool is used for cutting an object, some of the lubricant ducted to the cutting unit will stick to the object. A solution utilizing a dipstick, a transparent inspection window, an inspection opening comprising a cover, and/or a float, is arranged to provide an indication of the supply of lubricant when the cutting tool is not used for cutting, and as mentioned above, when the cutting tool is oriented at a predetermined orientation angle relative the gravitational field. However, since the method, according to the present disclosure, comprises the step of monitoring the supply of lubricant in the lubrication system by monitoring the change in temperature of the portion of the lubrication system, a method is provided capable of monitoring the supply of lubricant during operation of the hand-held cutting tool. Since the supply of lubricant can be monitored during operation of the hand-held cutting tool, an insufficient supply of lubricant that occurs during operation of the cutting tool can be detected. As a result, a method is provided with an improved ability to monitor the supply of lubricant in a lubrication system of a hand-held cutting tool.

Accordingly, a method is provided overcoming, or at least alleviating, at least some of the above-mentioned problems and drawbacks. As a result, the above-mentioned object is achieved.

Optionally, the method further comprises:
monitoring the change in temperature of the portion of the lubrication system by monitoring the change in electrical resistance of the heating element.

The electrical resistance of a heating element changes in dependence of the temperature of the heating element. Thus, by monitoring the change in electrical resistance of the heating element, the change in temperature of the portion of the lubrication system is monitored in a simple, efficient and reliable manner.

Optionally, the hand-held cutting tool comprises a temperature sensor in thermal contact with the portion of the lubrication system, and wherein the method comprises:
monitoring the change in temperature of the portion of the lubrication system using data from the temperature sensor.

Thereby, the change in temperature of the portion of the lubrication system is monitored in a simple, efficient and reliable manner.

Optionally, the method further comprises:
monitoring the supply of lubricant in the lubrication system by monitoring the temperature of the portion of the lubrication system a predetermined time after the heating element has started to heat the portion.

Thereby, the monitoring of the effects of the heating is performed in a consistent, comparable, and simple manner. As a result, a method is provided capable of monitoring the supply of lubricant in a lubrication system of a hand-held cutting tool in a still further efficient and reliable manner.

Optionally, the method further comprises:
heating the portion of the lubrication system recurringly at regular or irregular intervals.

Thus, according to these embodiments, the portion may be heated during some time periods and may not be heated during some other time periods, or may at least be subjected to a varying amount of heating. As a result, the changes in temperature of the portion can more easily be monitored and thus also the supply of lubricant in a lubrication system of a hand-held cutting tool. Thus, a method is provided capable of monitoring the supply of lubricant in a lubrication system of a hand-held cutting tool in a still further efficient and reliable manner. Further, since the method comprises heating the portion recurringly at regular or irregular intervals, the energy consumption can be lowered.

Optionally, the method further comprises:
notifying a user of the hand-held cutting tool in case the monitored supply of lubricant in the lubrication system is below a predetermined threshold value.

Thereby, a method is provided capable of assisting a user of a hand-held cutting tool to avoid metal to metal contact, to prolonging the life time of the cutting unit of the hand-held cutting tool, to lower the generation of heat and noise of the cutting tool, and/or to lower the driving resistance of the cutting unit, in an efficient and reliable manner.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
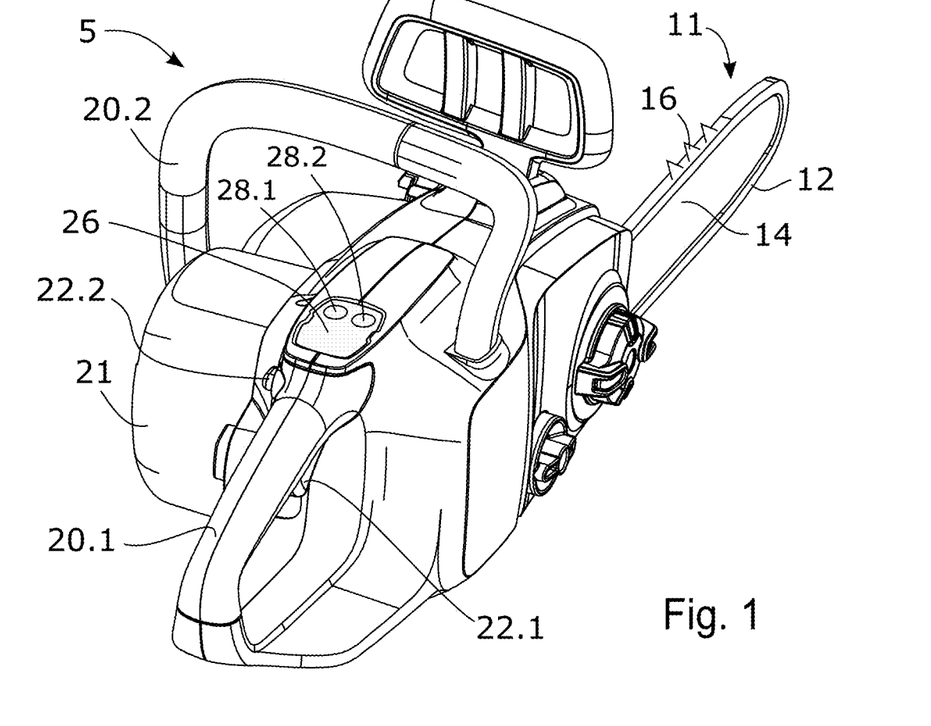
FIG. 1 illustrates a hand-held cutting tool, according to some embodiments.

FIG. 1 illustrates a hand-held cutting tool 5, according to some embodiments. According to the illustrated embodiments, the hand-held cutting tool 5 is a chainsaw comprising a cutting unit 11 in the form of a cutting chain 12 movably arranged around a guide bar 14 of the hand-held cutting tool 5. The cutting chain 12 comprises a number of cutting members 16 attached to the cutting chain 12. According to further embodiments, the hand-held cutting tool 5 may be another type of hand-held cutting tool 5, such as a hedge trimmer, a cutting saw, a pole saw, or the like, which may comprise another type of cutting unit, such as a shear, a cutter, a saw blade, or the like.

The hand-held cutting tool 5 comprises a first handle 20.1 and a second handle 20.2. Each of the first and second handle 20.1, 20.2 is arranged to be gripped by a hand of a user. The first handle 20.1 comprises an actuator 22.1 and a safety button 22.2. The hand-held cutting tool 5 comprises a motor 21. The motor 21 is configured to drive cutting unit 11 when the hand-held cutting tool 5 is activated and when the actuator 22.1 and the safety button 22.2 are pressed. According to the illustrated embodiments, the motor 21 is an electric motor 21. The electric motor 21 may comprise a brushless direct-current motor. The hand-held cutting tool 5 may comprise one or more batteries, a power cord, and/or a power socket arranged to supply electricity to the electric motor 21 and to other components of the hand-held cutting tool 5. According to further embodiments, the motor 21 may comprise a combustion engine. The hand-held cutting tool 5 comprises a lubrication system configured to lubricate the cutting unit 11, and a lubrication monitoring arrangement configured to monitor a supply of lubricant in the lubrication system 3, as will be further explained with reference to FIG. 2.

Figure 2:
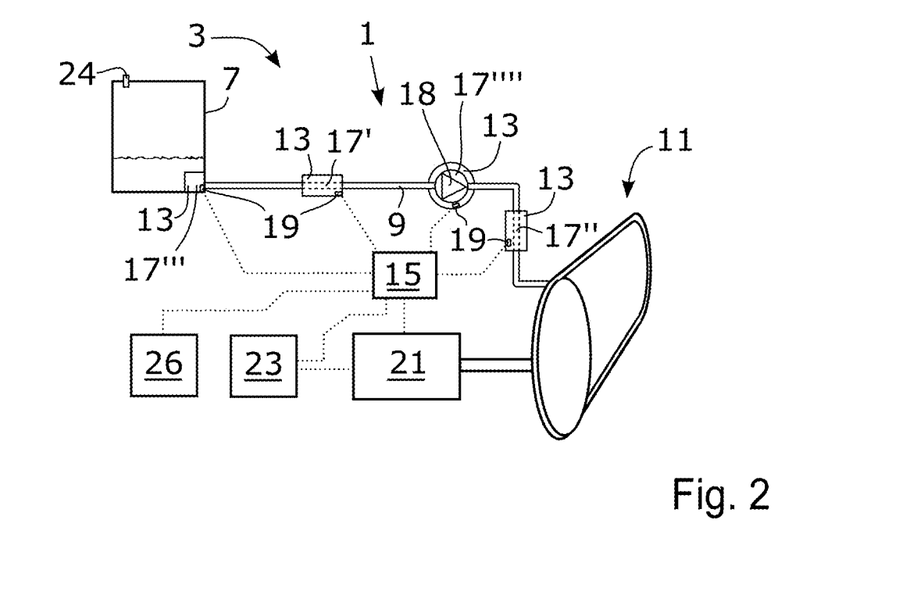
FIG. 2 schematically illustrates the motor, the cutting unit, a battery, the lubrication system, and the lubrication monitoring arrangement of the hand-held cutting tool illustrated in FIG. 1.

FIG. 2 schematically illustrates the motor 21, the cutting unit 11, a battery 23, the lubrication system 3, and the lubrication monitoring arrangement 1 of the hand-held cutting tool 5 illustrated in FIG. 1. The lubrication system 3 comprises a tank 7 and a conduit 9. The tank 7 is configured to accommodate lubricant. The conduit 9 is configured to duct lubricant from the tank 7 to the cutting unit 11 to lubricate the cutting unit 11.

The lubrication monitoring arrangement 1 comprises at least one heating element 13 and a control unit 15. The heating element 13 is arranged to heat a portion 17', 17", 17''', 17'''' of the lubrication system 3. According to the illustrated embodiments, the lubrication monitoring arrangement 1 comprises four heating elements 13 each arranged to heat a different portion 17', 17", 17''', 17'''' of the lubrication system 3. However, the lubrication monitoring arrangement 1 may comprise only one of the four heating elements 13. According to further embodiments, the lubrication monitoring arrangement 1 comprises two or more heating elements 13. Each of the heating elements 13 may comprise an electric heating element. According to the illustrated embodiments, the battery 23 of the hand-held cutting tool is configured to supply electricity to components of the hand-held cutting tool, such as heating elements 13, the control unit 15 of the lubrication monitoring arrangement 1, and the motor 21.

The control unit 15 is configured to monitor the supply of lubricant in the lubrication system 3 by monitoring the change in temperature of the portion 17', 17", 17'", 17"" of the lubrication system 3. According to the illustrated embodiments, the lubrication system 3 comprises a pump 18 configured to pump lubricant through the conduit 9 from the tank 7 to the cutting unit 11, to lubricate the cutting unit 11.

As illustrated, the portion 17', 17" of the lubrication system 3 may be a portion 17' of the conduit 9 upstream of the pump 18, and/or a portion 17" of the conduit 9 downstream of the pump 18. Accordingly, the lubrication monitoring arrangement 1 may comprise a heating element 13 arranged to heat a portion 17' of the conduit 9 upstream of the pump 18, and/or may comprise a heating element 13 arranged to heat a portion 17" of the conduit 9 downstream of the pump 18.

Further, as illustrated, the portion 17"" of the lubrication system 3 may be a portion 17"" of the pump 18. Accordingly, the lubrication monitoring arrangement 1 may comprise a heating element 13 arranged to heat a portion 17"" of the pump 18. According to the illustrated embodiments, the heating element 13 encloses the pump 18 and is configured to heat the entire pump 18. According to further embodiments, the heating element 13 may be configured to heat a portion 17"" of the pump 18, such as a pumping chamber of the pump 18, an inlet portion of the pump 18, and/or an outlet portion of the pump 18.

Further, as illustrated, the portion 17'" of the lubrication system 3 may be a portion 17'" of the tank 7. Accordingly, the lubrication monitoring arrangement 1 may comprise a heating element 13 arranged to heat a portion 17"" of the tank 7. According to the illustrated embodiments, the portion 17"" of the tank 7 is an outlet portion 17"" of the tank 7.

The lubrication monitoring arrangement 1 according to the illustrated embodiments is capable of detecting an insufficient supply of lubricant in the tank 7, as well as detecting an insufficient supply of lubricant in the lubrication system 3 caused a malfunction of the lubricant system 3. A malfunction of the lubricant system 3 may for example occur when the conduit 9 becomes clogged, when an inlet or outlet of the conduit 9 becomes clogged, when an outlet of the tank 7 becomes clogged, when a vent opening 24 of the tank 7 becomes clogged, and/or when the pump 18 unexpectedly stops pumping lubricant for some reason. In these cases, the malfunction may cause the lubricant to be stationary in the conduit 9, and may cause the lubricant to not flow through the pump 18, or may at least cause the lubricant to flow through the conduit 9 and the pump 18 with a low flow rate. The lubrication monitoring arrangement 1 is capable of detecting an insufficient supply of lubricant caused a malfunction of the lubricant system 3 since such a malfunction will affect the change in temperature of the portion 17', 17" of the conduit 9, the outlet portion 17"" of the tank 7, and the portion 17"" of the pump 18.

That is, in case the lubrication system 3 is working properly, and lubricant is flowing from the outlet portion 17'" of the tank 7, through the conduit 9 and through the pump 18, the flow of lubricant will have a cooling effect on the outlet portion 17'" of the tank 7, the portions 17', 17" of the conduit 9, and on the portion 17"" of the pump 18. Accordingly, when the portion 17', 17", 17'", 17"" of the lubrication system 3 is heated, the portion 17', 17", 17'", 17"" will be subjected to a slower increase in temperature than is the case when air is present in the portion 17', 17", 17'", 17"", and that is the case when lubricant is stationary in the portion 17', 17", 17'", 17"". Further, if lubricant is present in the portion 17', 17", 17'", 17"" of the lubrication system 3 but a malfunction of the lubrication system 3 causes the lubricant to not flow through the portion 17', 17", 17'", 17"", the portion 17', 17", 17'", 17"" will be subjected to a slower increase in temperature than is the case when air is present in the portion 17', 17", 17'", 17"". This because lubricant has a significantly higher heat capacity than air.

Accordingly, the control unit 15 of the lubrication monitoring arrangement 1 may detect all the above-mentioned states of the lubrication system 3 simply by monitoring the change in temperature of the portion the portion 17', 17", 17'", 17"" of the lubrication system 3.

According to some embodiments, the control unit 15 is configured to monitor the change in temperature of the portion 17', 17", 17'", 17"" of the lubrication system 3 by monitoring the change in electrical resistance of the heating element 13. The electrical resistance of a heating element 13 changes in dependence of the temperature of the heating element 13. Thus, by monitoring the change in electrical resistance of the heating element 13, the control unit 15 can monitor the change in temperature of the portion 17', 17", 17'", 17"" of the lubrication system 3 in a simple, efficient and reliable manner.

According to the illustrated embodiments, the lubrication monitoring arrangement 1 comprises temperature sensors 19 in thermal contact with the portions 17', 17", 17'", 17"" of the lubrication system 3. The lubrication monitoring arrangement 1 may comprise one temperature sensor 19 per heating element 13. The control unit 15 is configured to monitor the change in temperature of the portion 17', 17", 17'", 17"" of the lubrication system 3 using data from the temperature sensors 19. The temperature sensors 19 may for example comprise a thermistor such as a Negative Temperature Coefficient NTC thermistor or a Positive Temperature Coefficient PTC thermistor.

The control unit 15 may be configured to monitor the change in temperature of the portion 17', 17", 17'", 17"" during heating of the portion 17', 17", 17'", 17"". Thereby, an instantaneous monitoring of the effects of the heating is performed. Further, the control unit 15 may be configured to monitor the supply of lubricant in the lubrication system 3 by monitoring the temperature of the portion 17', 17", 17'", 17"" a predetermined time after the heating element 13 has started to heat the portion 17', 17", 17'", 17"". As an alternative, or in addition, the control unit 15 may be configured to continuously monitoring the temperature of the portion 17', 17", 17'", 17"" and may determine if the supply of lubricant in the lubrication system 3 is insufficient by monitoring the rate of change of the temperature of the portion 17', 17", 17'", 17"". According to some embodiments, the heating element 13 is configured to heat the portion 17', 17", 17'", 17"" until the portion 17', 17", 17'", 17"" reaches a predetermined temperature. According to such embodiments, the control unit 15 may be configured to monitor the supply of lubricant in the lubrication system 3 by monitoring the time required for the portion 17', 17", 17'", 17"" to reach the predetermined temperature.

The heating element 13 may be configured to heat the portion 17', 17", 17'", 17"" recurringly at regular or irregular intervals. According to some embodiments, the heating element 13 may be configured to heat the portion 17', 17", 17'", 17"" recurringly at regular or irregular intervals by heating the portion 17', 17", 17'", 17"" in first time periods, and not heat the portion 17', 17", 17''', 17'''' in second time periods, wherein the second time periods are between the first time periods. The length of the first and/or second time periods may be fix, or may vary, for example in dependence of a temperature of the portion 17', 17", 17''', 17''''.

Purely as examples, the duration of the first time period and the duration of the second time period may each be within the range of 2-40 seconds, 2-20 seconds, 4-15 seconds, 8-12 seconds, or approximately 10 seconds. According to further embodiments, the heating element 13 may be configured to heat the portion 17', 17", 17''', 17'''' with a varying intensity, for example with a first intensity during first time periods and with a second intensity during second time periods, wherein the second time periods are between the first time periods. The length of the first and/or second time periods may be fix, or may vary, for example in dependence of a temperature of the portion 17', 17", 17''', 17''''. Also as examples, the durations of such time periods may be within the range of 2-40 seconds, 2-20 seconds, 4-15 seconds, 8-12 seconds, or approximately 10 seconds. Due to the heating of the portion 17', 17", 17''', 17'''' of the lubrication system 3 recurringly at regular or irregular intervals, the control unit 15 can more easily monitor changes in temperature of the portion 17', 17", 17''', 17'''' and thus also more easily monitor the supply of lubricant in the lubrication system 3 of the hand-held cutting tool. Further, due to the heating of the portion 17', 17", 17''', 17'''' of the lubrication system 3 recurringly at regular or irregular intervals, or with a varying intensity, the energy consumption of the heating element 13, or elements 13, can be lowered.

According to the illustrated embodiments, the lubrication monitoring arrangement 1 comprises a user interface 26. The control unit 15 is configured to notify a user of the hand-held cutting tool 5, via the user interface 26, in case the monitored supply of lubricant in the lubrication system 3 is below a predetermined threshold value.

The user interface 26 is also illustrated in FIG. 1. According to the illustrated embodiments, the user interface 26 comprises a first and a second indicator lamp 28.1, 28.2. The control unit 15 is configured to activate the first indicator lamp 28.1, in case the monitored supply of lubricant indicates an insufficient supply of lubricant in the tank of the lubrication system 3. Further, the control unit 15 is configured to activate the second indicator lamp 28.2, in case the monitored supply of lubricant indicates an insufficient supply of lubricant in the lubrication system 3 caused a malfunction of the lubricant system 3. Thereby, a user of the hand-held cutting tool 5 may perform measures in dependence of the reason for the insufficient supply of lubricant in the lubrication system of the hand-held cutting tool 5. As an alternative, or in addition to the indicator lamps 28.1, 28.2, the user interface 26 may comprise another type of indication device, such as a display, a speaker, or the like.

As a further alternative, or in addition the above-mentioned alternatives, the control unit 15 may be configured to notify a user of the hand-held cutting tool 5, in case the monitored supply of lubricant in the lubrication system 3 is below a predetermined threshold value, by deactivating, restricting, and/or limiting the function of the hand-held cutting tool 5.

Figure 3:
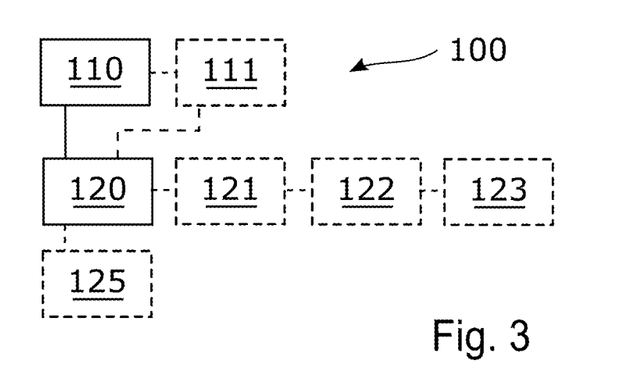
FIG. 3 illustrates a method of monitoring a supply of lubricant in a lubrication system of a hand-held cutting tool.

FIG. 3 illustrates a method 100 of monitoring a supply of lubricant in a lubrication system of a hand-held cutting tool. The hand-held cutting tool may be a hand-held cutting tool 5 as illustrated in FIG. 1, and the lubrication system may be a lubrication system 3 as illustrated in FIG. 2. Therefore, below, reference is made to FIG. 3 as well as to FIG. 1 and FIG. 2. The method 100 illustrated in FIG. 3, is a method 100 of monitoring a supply of lubricant in a lubrication system 3 of a hand-held cutting tool 5, wherein the lubrication system 3 comprises a tank 7 and a conduit 9, wherein the conduit 9 is configured to duct lubricant from the tank 7 to a cutting unit 11 of the cutting tool 5, and wherein the method 100 comprises:

heating 110 a portion 17', 17", 17''', 17'''' of the lubrication system 3, and monitoring 120 the supply of lubricant in the lubrication system 3 by monitoring the change in temperature of the portion 17', 17", 17''', 17'''' of the lubrication system 3.

As illustrated in FIG. 3, the method 100 may further comprise:

monitoring 121 the change in temperature of the portion 17', 17", 17''', 17'''' of the lubrication system 3 by monitoring the change in electrical resistance of the heating element 13.

According to some embodiments, the hand-held cutting tool 5 comprises a temperature sensor 19 in thermal contact with the portion 17', 17", 17''', 17'''' of the lubrication system 3, and according to such embodiments the method 100 may comprise:

monitoring 122 the change in temperature of the portion 17', 17", 17''', 17'''' of the lubrication system 3 using data from the temperature sensor 19.

Further, as illustrated in FIG. 3, the method 100 may comprise:

monitoring 123 the supply of lubricant in the lubrication system 3 by monitoring the temperature of the portion 17', 17", 17''', 17'''' of the lubrication system 3 a predetermined time after the heating element 13 has started to heat the portion 17', 17", 17''', 17''''.

Further, as illustrated in FIG. 3, the method 100 may comprise:

heating 111 the portion 17', 17", 17''', 17'''' of the lubrication system 3 recurringly at regular or irregular intervals.

Further, as illustrated in FIG. 3, the method 100 may comprise:

notifying 125 a user of the hand-held cutting tool 5 in case the monitored supply of lubricant in the lubrication system 3 is below a predetermined threshold value.

It will be appreciated that the various embodiments described for the method 100 are all combinable with the control unit 15 as described herein. That is, the control unit 15 may be configured to perform any one of the method steps 110, 111, 120, 121, 122, 123, and 125 of the method 100.

The control unit 15 may be connected to one or more components of the hand-held cutting tool 5 in order to perform the method 100 illustrated in FIG. 3. The control unit 15 may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

One skilled in the art will appreciate that the method 100 of monitoring a supply of lubricant in a lubrication system 3 of a hand-held cutting tool 5 may be implemented by programmed instructions. These programmed instructions are typically constituted by a computer program, which, when it is executed in the control unit 15, ensures that the control unit 15 carries out the desired control, such as the method steps 110, 111, 120, 121, 122, 123, and 125 described herein. The computer program is usually part of a computer program product which comprises a suitable digital storage medium on which the computer program is stored.

The computer program product may be provided for instance in the form of a data carrier carrying computer program code for performing at least some of the method steps 110, 111, 120, 121, 122, 123, and 125 according to some embodiments when being loaded into one or more calculation units of the control unit 15. The data carrier may be, e.g. a CD ROM disc or a ROM (read-only memory), a PROM (programmable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control unit 15 remotely, e.g., over an Internet or an intranet connection, or via other wired or wireless communication systems.

The control unit 15 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control unit 15 is connected to components of the hand-held cutting tool 5 for receiving and/or sending input and output signals. These input and output signals may comprise waveforms, pulses or other attributes which the input signal receiving devices can detect as information and which can be converted to signals processable by the control unit 15. These signals may then be supplied to the calculation unit. One or more output signal sending devices may be arranged to convert calculation results from the calculation unit to output signals for conveying to other parts of the hand-held cutting tool 5. Each of the connections to the respective components of the hand-held cutting tool 5 for receiving and sending input and output signals may take the form of one or more from among a cable, a data bus, or some other bus configuration, or a wireless connection.

In the embodiments illustrated, the lubrication monitoring arrangement 1 comprises a control unit 15 but might alternatively be implemented wholly or partly in two or more control units.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions or groups thereof.

In embodiments where the hand-held cutting tool 5 comprises an electric motor 21 configured to drive the cutting unit 11 during operation of the hand-held cutting tool 5, the hand-held cutting tool 5 may be referred to as the "hand-held electrical cutting tool 5".

The invention claimed is:

1. A lubrication monitoring arrangement configured to monitor a supply of lubricant in a lubrication system of a hand-held cutting tool,
   wherein the lubrication system comprises a tank and a conduit, wherein the conduit is configured to duct lubricant from the tank to a cutting unit of the cutting tool,
   wherein the arrangement comprises a heating element and a control unit,
   wherein the heating element is arranged to heat a portion of the lubrication system,
   and wherein the control unit is configured to monitor the supply of lubricant in the lubrication system by monitoring a change in temperature of the portion of the lubrication system.

2. The arrangement according to claim 1, wherein the portion of the lubrication system is a portion of the conduit.

3. The arrangement according to claim 1, wherein the portion of the lubrication system is a portion of the tank.

4. The arrangement according to claim 1, wherein the lubrication system comprises a pump configured to pump lubricant through the conduit from the tank to the cutting unit, and wherein the portion the lubrication system is a portion of the pump.

5. The arrangement according to claim 1, wherein the control unit is configured to monitor the change in temperature of the portion of the lubrication system by monitoring a change in electrical resistance of the heating element.

6. The arrangement according to claim 1, comprising a temperature sensor, wherein the temperature sensor is in thermal contact with the portion of the lubrication system, and wherein the control unit is configured to monitor the change in temperature of the portion of the lubrication system using data from the temperature sensor.

7. The arrangement according to claim 1, wherein the control unit is configured to monitor the change in temperature of the portion during heating of the portion of the lubrication system.

8. The arrangement according to claim 1, wherein the control unit is configured to monitor the supply of lubricant in the lubrication system by monitoring the temperature of the portion of the lubrication system a predetermined time after the heating element has started to heat the portion of the lubrication system.

9. The arrangement according to claim 1, wherein the heating element is configured to heat the portion of the lubrication system recurringly at regular or irregular intervals.

10. The arrangement according to claim 1, wherein the control unit is configured to notify a user of the hand-held cutting tool in case the monitored supply of lubricant in the lubrication system is below a predetermined threshold value.

11. A hand-held cutting tool comprising a cutting unit and a lubrication system configured to lubricate the cutting unit, wherein the lubrication system comprises a tank and a conduit, wherein the conduit is configured to duct lubricant from the tank to the cutting unit, and wherein the cutting tool further comprises a lubrication monitoring arrangement, wherein the lubrication monitoring arrangement comprises a heating element and a control unit,
- wherein the heating element is arranged to heat a portion of the lubrication system,
- and wherein the control unit is configured to monitor a supply of lubricant in the lubrication system by monitoring a change in temperature of the portion of the lubrication system.

12. The cutting tool according to claim 11, wherein the cutting tool comprises an electric motor configured to drive the cutting unit during operation of the cutting tool.

13. The cutting tool according to claim 11, wherein the cutting tool is a chainsaw, and wherein the cutting unit is a cutting chain.

14. A method of monitoring a supply of lubricant in a lubrication system of a hand-held cutting tool, wherein the lubrication system comprises a tank and a conduit, wherein the conduit is configured to duct lubricant from the tank to a cutting unit of the cutting tool, and wherein the method comprises:
- heating a portion of the lubrication system, and
- monitoring a supply of lubricant in the lubrication system by monitoring a change in temperature of the portion of the lubrication system.

15. The method according to claim 14, further comprising:
- monitoring the change in temperature of the portion of the lubrication system by monitoring a change in electrical resistance of the heating element.

16. The method according to claim 14, wherein the hand-held cutting tool comprises a temperature sensor in thermal contact with the portion of the lubrication system, and wherein the method comprises:
- monitoring the change in temperature of the portion of the lubrication system using data from the temperature sensor.

17. The method according to claim 14, further comprising:
- monitoring the supply of lubricant in the lubrication system by monitoring the temperature of the portion of the lubrication system a predetermined time after the heating element has started to heat the portion.

18. The method according to claim 14, comprising:
- heating the portion of the lubrication system recurringly at regular or irregular intervals.

19. The method according to claim 14, further comprising:
- notifying a user of the hand-held cutting tool in case the monitored supply of lubricant in the lubrication system is below a predetermined threshold value.

* * * * *